United States Patent
Takemura et al.

(10) Patent No.: US 9,711,979 B2
(45) Date of Patent: Jul. 18, 2017

(54) POWER SUPPLY SYSTEM

(71) Applicant: MITSUBISHI ELECTRIC CORPORATION, Chiyoda-ku (JP)

(72) Inventors: Daigo Takemura, Chiyoda-ku (JP);
Sho Shiraga, Chiyoda-ku (JP);
Toshihiro Wada, Chiyoda-ku (JP);
Shoji Yoshioka, Chiyoda-ku (JP);
Shigeki Harada, Chiyoda-ku (JP);
Hiroshi Araki, Chiyoda-ku (JP);
Hisanori Yamasaki, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/121,319

(22) PCT Filed: Mar. 5, 2015

(86) PCT No.: PCT/JP2015/056460
§ 371 (c)(1),
(2) Date: Aug. 24, 2016

(87) PCT Pub. No.: WO2015/137222
PCT Pub. Date: Sep. 17, 2015

(65) Prior Publication Data
US 2017/0012445 A1  Jan. 12, 2017

(30) Foreign Application Priority Data
Mar. 12, 2014  (JP) ................................. 2014-048275

(51) Int. Cl.
*H02P 1/00* (2006.01)
*H02J 7/00* (2006.01)
(Continued)

(52) U.S. Cl.
CPC ......... *H02J 7/0024* (2013.01); *H01M 10/425* (2013.01); *H01M 10/441* (2013.01);
(Continued)

(58) Field of Classification Search
CPC ........ H02J 7/0024; H02J 5/005; H02J 7/0021; H01M 10/441; H01M 10/425; H01M 2010/4271; H02P 27/08
(Continued)

(56) References Cited

U.S. PATENT DOCUMENTS 5,311,112 A * 5/1994 Creaco ................. H02J 7/0021
320/119
8,766,566 B2 * 7/2014 Baba ..................... H02J 7/0054
318/139
(Continued)

FOREIGN PATENT DOCUMENTS

| JP | 2010-110124 A | 5/2010 |
|---|---|---|
| JP | 2012-234696 A | 11/2012 |

(Continued)

OTHER PUBLICATIONS

International Search Report Issued Apr. 21, 2015 in PCT/JP15/056460 Filed Mar. 5, 2015.

*Primary Examiner* — Bentsu Ro
*Assistant Examiner* — Thai Dinh
(74) *Attorney, Agent, or Firm* — Oblon, McClelland, Maier & Neustadt, L.L.P.

(57) ABSTRACT

In a power supply system using various kinds of storage batteries such as a large capacity storage battery or a small capacity storage battery, an electric power path is complicated, which may increase failures such as a short circuit trouble. There is a problem in that, when a short circuit trouble between storage batteries occurs, damage to a smaller capacity storage battery is serious. Accordingly, in a power supply system according to the present invention, the relationship among voltages, current capacities, and electric power capacities of various kinds of storage batteries such as a large capacity storage battery or a small capacity storage battery is defined so that damage to the storage batteries may be minimized even when malfunction occurs in, for example, switching a switch, and energy transfers from a higher voltage storage device.

5 Claims, 5 Drawing Sheets

(51) Int. Cl.
  *H01M 10/42* (2006.01)
  *H01M 10/44* (2006.01)
  *H02P 27/08* (2006.01)

(52) U.S. Cl.
  CPC ............ *H02J 7/0021* (2013.01); *H02P 27/08* (2013.01); *H01M 2220/20* (2013.01)

(58) Field of Classification Search
  USPC .................................. 318/139, 722, 400.22
  See application file for complete search history.

(56) References Cited

U.S. PATENT DOCUMENTS

| | | | |
|---|---|---|---|
| 2007/0164693 A1* | 7/2007 | King | B60K 6/28 318/109 |
| 2010/0019728 A1* | 1/2010 | Ichikawa | B60L 1/003 320/134 |
| 2013/0264975 A1 | 10/2013 | Kaita et al. | |
| 2014/0062409 A1* | 3/2014 | Endo | H02J 7/0029 320/126 |
| 2014/0103859 A1 | 4/2014 | Nishi | |
| 2015/0035494 A1 | 2/2015 | Suzuki | |

FOREIGN PATENT DOCUMENTS

| | | |
|---|---|---|
| JP | 2013-85413 A | 5/2013 |
| JP | 2013-233002 A | 11/2013 |
| WO | 2012/085992 A1 | 6/2012 |
| WO | 2012/164630 A1 | 12/2012 |
| WO | 2013/114697 A1 | 8/2013 |

\* cited by examiner

POWER SUPPLY SYSTEM

TECHNICAL FIELD

The present invention relates to a power supply system. Specifically, the present invention relates to an energy regenerative storage system including a storage device, e.g., a lithium-ion secondary battery, a bidirectional DC-DC converter, and the like.

BACKGROUND ART

A lithium-ion secondary battery has been mainly used for portable electronic apparatuses as a lightweight and high-energy density storage device. In recent years, a lithium-ion secondary battery has come to have higher power and has also been adopted for use in large vehicles such as a hybrid automobile and a hybrid rail car. As a tendency in developing a lithium-ion secondary battery, as shown in FIG. 5, the development is becoming bifurcated as follows: development toward a larger capacity and a higher energy density; and development toward a smaller capacity and a higher power density. In applications for a storage device, it is often the case that the peak power is high but only momentary. If, of the bifurcated storage devices described above, only larger capacity and higher energy density storage devices are used, energy more than necessary is mounted. On the other hand, if only the smaller capacity and higher power density storage devices are used, the configuration has power more than necessary. In this way, when any one of the two types of storage devices is adopted, the configuration has unnecessary energy or power, which leads to increases in weight, volume, and cost of storage systems. Therefore, there have been proposed cases in which a high power type storage device and a large capacity type storage device are connected via a bidirectional DC-DC converter.

For example, in a power supply system described in Patent Literature 1, a DC-DC converter is arranged only for an auxiliary secondary battery block. It is described that, through boosting an output voltage of the auxiliary secondary battery block to a level equivalent to that of a main secondary battery block using the DC-DC converter, the auxiliary secondary battery block and the main secondary battery block are operated in parallel, thereby charging from and discharging to a load. According to the invention described in Patent Literature 1, the main secondary battery block is always connected without the DC-DC converter, and the auxiliary secondary battery block is always connected via the DC-DC converter.

In Patent Literature 2, there is introduced, as an application for a electric vehicle, e.g., a hybrid automobile or an electric automobile, a configuration of a power supply system in which a second storage battery 2 connected via a bidirectional DC-DC converter so as to be in parallel to a first storage battery is boosted when used, and is controlled through opening/closing a relay.

In the configuration of Patent Literature 2, a relay is arranged so that two high voltage batteries may be solely connected and may be connected in parallel to each other. However, in such a configuration, a first storage battery is always connected without a DC-DC converter, and a second storage battery 2 is always connected via the DC-DC converter. When a storage battery connected via a DC-DC converter and a storage battery connected without the DC-DC converter are fixed in this way, the efficiency is lowered to narrow the range of applications depending on a load pattern. Further, when the lifetime of the storage batteries is taken into consideration, it is necessary to form a configuration taking into consideration the voltages and the capacities of the storage batteries.

On the other hand, when the configuration is formed so that a plurality of electric power supply paths can be obtained using a switch, various electric power paths are thought of, and thus, the design is required to be made taking into consideration safety. Although a secondary battery is rechargeable, in a lead-acid battery, a nickel metal hydride battery, or a NiCad battery in an overcharged state, water electrolysis occurs and the internal pressure increases and heat is generated. Meanwhile, in a lithium-ion secondary battery or an electric double-layer capacitor, an organic solvent is used in an electrolyte solution, and thus, there is a possibility that electrolyte solution decomposition reaction occurs.

In such a multiple-power supply system using a bidirectional DC-DC converter, high power storage devices can be connected in parallel through ON/OFF of a switch. However, depending on the pattern of power running and regeneration, energy is more efficiently given and received without a DC-DC converter when a storage device connected via the DC-DC converter is disconnected and a high power type storage device is mainly used. Meanwhile, when ON/OFF of the switch is performed, the electric power path is complicated and, in case of inconvenience, measures are required to be taken.

CITATION LIST

Patent Literature

[PTL 1] JP 2010-110124 A
[PTL 2] WO 2012-085992 A1

SUMMARY OF INVENTION

Technical Problem

The related-art power supply systems are formed as described above, and thus, in a multiple-power supply system using secondary batteries in which a plurality of storage batteries are connected via a DC-DC converter and an appropriate electric power path is formed through ON/OFF of a switch, it is difficult to form a configuration in which electric power is efficiently given/received and the storage batteries are held in a state of being less liable to be overcharged or overdischarged.

The present invention has been made in order to solve those problems, and an object of the present invention is to form a multiple-power supply system in which a plurality of storage batteries are connected via a bidirectional DC-DC converter and an appropriate electric power path is formed through ON/OFF of a switch so as to efficiently give/receive electric power and so that the storage batteries may not be in an overcharged state and may be held in a stable state even when a first storage battery and a second storage battery are electrically connected.

In other words, an object of the present invention is to provide a power supply system configured to efficiently give/receive electric power and is capable of holding a state in which the storage batteries are less liable to be overcharged or overdischarged.

Solution to Problem

According to one embodiment of the present invention, there is provided a power supply system, including: a first storage battery and a second storage battery connected in parallel to electric power giving/receiving equipment; a bidirectional DC-DC converter configured to give/receive electric power between the first storage battery and the second storage battery; a switch configured to be able to independently isolate the first storage battery and the second storage battery from a load apparatus; and a controller configured to control the switch and the DC-DC converter. Further, when a nominal voltage of the first storage battery is represented by Va, a rated capacity of the first storage battery is represented by U1, a nominal voltage of the second storage battery is represented by Vb, and a rated capacity of the second storage battery is represented by U2, the first storage battery and the second storage battery are formed so that relational expressions Va<Vb and U1>U2 are satisfied, and the nominal voltage Va of the first storage battery, the rated capacity U1 of the first storage battery, the nominal voltage Vb of the second storage battery, and the rated capacity U2 of the second storage battery are set so that, when electrical energy transfers from the second storage battery to the first storage battery, voltage increase of the first storage battery does not exceed a predetermined upper limit value V1Hlim, or, a capacity of the first storage battery does not exceed a predetermined upper limit value U1lim.

Advantageous Effects of Invention

The power supply system according to the present invention is formed as described above, and thus, the power supply system capable of holding a state in which the storage batteries are less liable to be overcharged or overdischarged can be obtained.

DESCRIPTION OF EMBODIMENTS

Embodiment 1

Figure 1:
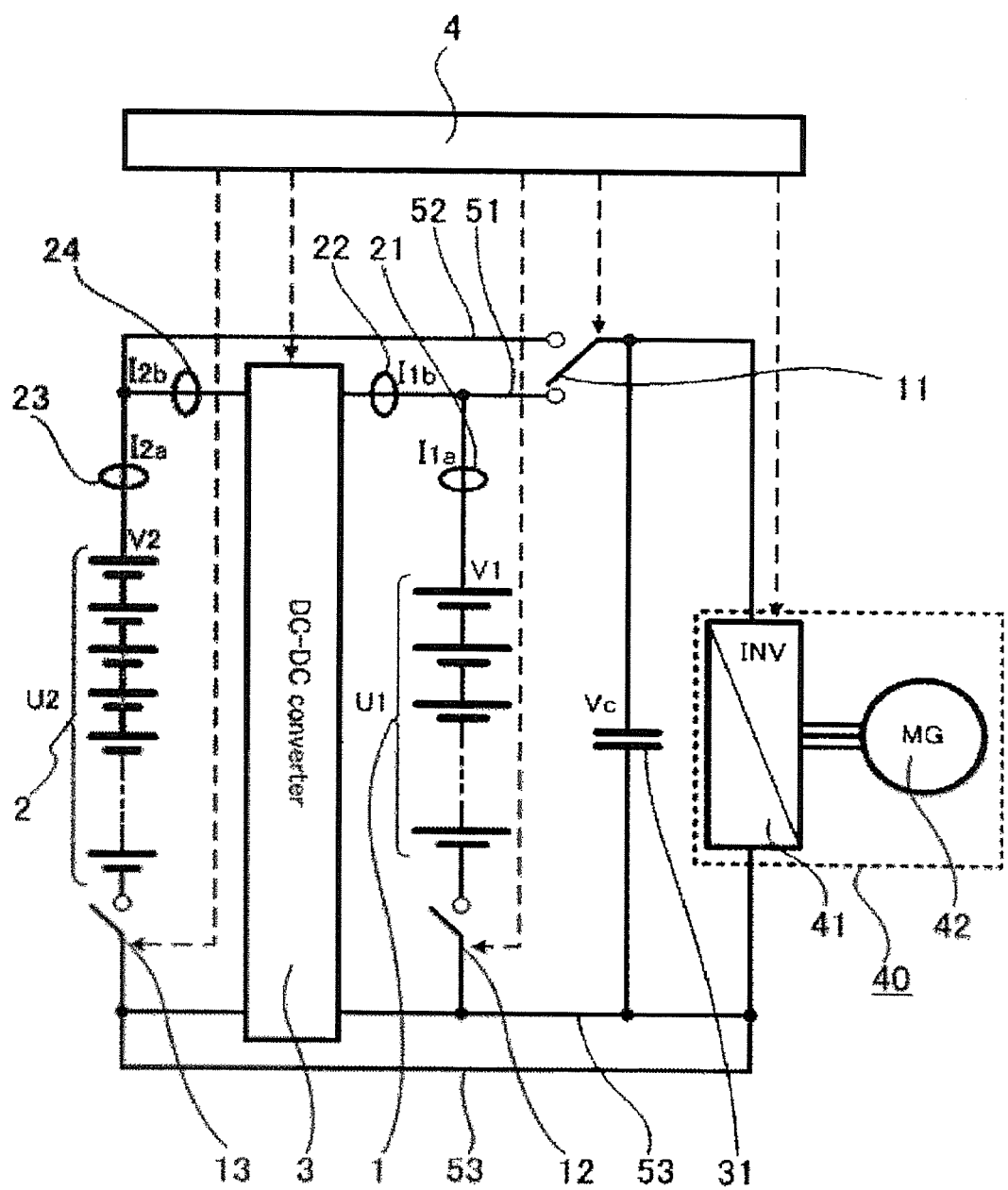
FIG. 1 is a schematic view of a power supply system according to Embodiment 1 of the present invention.

First, a configuration of a power supply system according to the present invention is described with reference to the drawings. Note that, the drawings are schematic and are for the purpose of conceptually illustrating a function, a configuration, or the like. Further, the drawings do not reflect accurate sizes of components illustrated and the like. Unless otherwise specified, a basic configuration of the power supply system is common to all embodiments. Further, like reference numerals are used to designate like or corresponding components throughout the specification.

FIG. 1 is a schematic view for schematically illustrating the configuration of the power supply system according to this embodiment. The power supply system according to this embodiment is described with reference to FIG. 1.

Note that, in this embodiment, a case in which a motor generator 42 and an inverter 41 are combined as exemplary electric power giving/receiving equipment 40 is described, but as long as a load configured to consume electric power and an apparatus having the function of generating electric power is combined, the present invention is not limited to equipment in which a motor generator and an inverter are combined. For example, an electric power giving/receiving combination of equipment having electric apparatus configured to consume electric power and solar photovoltaic power equipment is also included in the electric power giving/receiving equipment according to the present invention.

In FIG. 1, the power supply system according to this embodiment includes the motor generator 42, the inverter 41, a first storage battery 1, a second storage battery 2, a bidirectional DC-DC converter 3, a smoothing capacitor 31, switches (11, 12, and 13), and a controller 4. The inverter 41 converts AC electric power generated by the motor generator 42 to DC electric power, or, supplies AC electric power necessary for the motor generator from the power supply system. The motor generator 42 is an apparatus configured to function as a load consuming electric power and a generator, and thus, corresponds to the electric power giving/receiving equipment. Further, the bidirectional DC-DC converter 3 is a bidirectional DC-DC converter capable of boosting and lowering the voltage, and is a DC-DC converter capable of bidirectionally controlling the DC electric power between the first storage battery on a lower voltage side and the second storage battery on a higher voltage side. The bidirectional DC-DC converter 3 is also referred to as a reversible converter, a reversible system converter, a reversible type converter, a reversible chopper, and the like, all of which mean an equivalent element. Further, the first storage battery 1 is a large capacity storage battery. The second storage battery 2 is a high power storage battery.

The first and second storage batteries are formed so that relational expressions Va<Vb and U1>U2 may be set, where Va is a nominal voltage of the first storage battery 1, U1 is a rated capacity thereof, Vb is a nominal voltage of the second storage battery 2, and U2 is a rated capacity thereof. Va<Vb, and thus, supply of electric power from the first storage battery 1 to the second storage battery 2 via the bidirectional DC-DC converter 3 is voltage boosting operation. On the other hand, supply of electric power from the second storage battery to the first storage battery 1 is voltage lowering operation.

With regard to a large capacity storage battery, when two kinds of storage batteries having different discharge capacities (unit: Ah) are used, the storage battery having the larger discharge capacity is herein referred to as a large capacity storage battery. Further, in the case in which two kinds of storage batteries are used, when two or more cells, each of which is a minimum unit of a battery and has a small discharge capacity, are connected in parallel to enlarge the discharge capacity, comparison is made between the discharge capacities after the parallel connection, and the storage battery having the larger discharge capacity is referred to as a large capacity storage battery.

Further, with regard to a high power storage battery, when two kinds of storage batteries having different electric powers (unit: W) that can be input/output by the storage batteries are used, the storage battery capable of inputting/outputting the higher electric power is referred to as a high power storage battery. Further, in the case in which two kinds of storage batteries are used, when two or more cells, each of which is a minimum unit of a battery and is capable of inputting/outputting a low electric power, are connected in parallel to increase the electric power that can be input/output, comparison is made between the electric powers after the parallel connection, and the storage battery having the higher electric power is referred to as a high power storage battery.

Here, two kinds of storage batteries are compared and used. It is conceivable that a storage battery may have both the large capacity and the high power, but in this case, higher priority is given to having the large capacity, and the storage battery is referred to as a large capacity storage battery.

Further, the voltage of a storage battery is variable, and, in many cases, a nominal voltage is described in catalogs or the like. Here, a nominal voltage is a voltage value that is published by the manufacturer of the storage battery, and is sometimes a rated voltage value obtained by dividing the electric energy when the storage battery is fully charged by the rated capacity, or an average voltage. Therefore, a nominal voltage is defined as a voltage value including a rated voltage and an average voltage.

Similarly, the capacity of a storage battery is variable, and, in many cases, a rated capacity is described in catalogs or the like. A rated capacity sometimes means a discharge capacity when discharge is made at a current value defined by the manufacturer from a fully charged state, or a storage capacity in a fully charged state. The rated capacity may be a synonym of a nominal capacity that is a capacity value published by the manufacturer, and thus, a rated capacity is a term including a nominal capacity and a storage capacity in a fully charged state.

Note that, reference symbols used in the drawings and the description of this embodiment mean as follows.

Va: the nominal voltage, the rated voltage, or the average voltage of the first storage battery
U1: the nominal capacity, the rated capacity, or the storage capacity in a fully charged state of the first storage battery
V1: the voltage of the first storage battery
V1max: the voltage of the first storage battery when being charged to its rated capacity or an upper limit voltage of the first storage battery
V1min: the voltage of the first storage battery when being discharged by its rated capacity or a lower limit voltage of the first storage battery
V1Hlim: a maximum voltage that can be safely charged to the first storage battery (safe maximum voltage)
U1lim: a capacity to which the first storage battery can be safely charged (safe maximum capacity)
Wh1: a nominal electric power amount or a rated electric power amount of the first storage battery
Vb: the nominal voltage, the rated voltage, or the average voltage of the second storage battery
U2: the nominal capacity, the rated capacity, or the storage capacity in a fully charged state of the second storage battery
V2: the voltage of the second storage battery
V2max: the voltage of the second storage battery when being charged to its rated capacity or an upper limit voltage of the second storage battery
V2Hlim: a maximum voltage that can be safely charged to the second storage battery (safe maximum voltage)
V2min: the voltage of the second storage battery when being discharged by its rated capacity or a lower limit voltage of the second storage battery
V2Llim: a minimum voltage that can be safely discharged by the second storage battery (safe minimum voltage)
U2lim: a capacity to which the second storage battery can be safely charged (safe maximum capacity)
Wh2: a nominal electric power amount or a rated electric power amount of the second storage battery
Vc: a voltage of the smoothing capacitor
V12max: a voltage value to which the voltage approaches when the first storage battery having V1max and the second storage battery having V2max are electrically connected due to system malfunction
V12min: a voltage value to which the voltage approaches when the first storage battery having V1min and the second storage battery having V2min are electrically connected in parallel to each other due to system malfunction
ΔU1: a current capacity that flows from the second storage battery on the higher voltage side into the first storage battery on the lower voltage side
ΔV1: a voltage increase value of the first storage battery when a current capacity ΔU flows from the second storage battery on the higher voltage side into the first storage battery The bidirectional DC-DC converter 3 is arranged between the first storage battery 1 and the second storage battery 2. The bidirectional DC-DC converter 3 is a bidirectional DC-DC converter capable of boosting and lowering the voltage and enabling giving/receiving of electric power between the first storage battery 1 and the second storage battery 2. The bidirectional DC-DC converter 3 performs giving/receiving of electric power between the first storage battery 1 and the inverter or between the second storage battery 2 and the inverter 41 depending on the connected state of the switches.

Examples of the motor generator 42 include a three-phase wound-rotor induction motor and a permanent magnet three-phase synchronous motor, but the present invention is not limited thereto. The motor generator 42 is used as a generator in regeneration operation and is used as a motor configured to generate driving force in power running operation. In this embodiment, the motor generator 42 is described as a load apparatus and an electric power generating apparatus, but this is only exemplary, and the electric power generating apparatus may be a solar cell panel and the load may be a load facility for home use.

Electric power generated in regeneration is converted from alternative current electric power into DC electric power by the inverter 41 to be supplied to the multiple-power supply system. In this case, the multiple-power supply system is, specifically, a power supply system as illustrated in FIG. 1 that has a configuration including the first storage battery 1 and the second storage battery 2 having different capacities and voltages, the switches for connection between the batteries, the bidirectional DC-DC converter 3 configured to adjust the voltage, and the like. Further, in this embodiment, a configuration that consumes electric power and that generates electric power in regeneration such as the motor generator 42 is referred to as the electric power giving/receiving equipment 40.

Further, in power running, DC electric power is supplied from the multiple-power supply system, is converted into alternating current by the inverter 41, and is supplied to the motor as AC electric power. The inverter 41 is an ordinary three-phase inverter. The inverter 41 is a variable voltage variable frequency (VVVF) inverter or a pulse width modulated (PWM) inverter, and performs bidirectional DC-AC conversion. However, when the motor generator 42 is a direct current one, the inverter 41 is unnecessary, and thus, the electric power giving/receiving equipment 40 does not necessarily require the inverter 41.

The smoothing capacitor 31 is arranged in parallel to the inverter 41, and is arranged for the purpose of smoothing a ripple current generated by the inverter 41.

The bidirectional DC-DC converter 3 includes a semiconductor switching element for electric power, a diode, a capacitor, a reactor, and the like. As the semiconductor switching element for electric power, a switching element that can be ON/OFF controlled, e.g., an insulated gate bipolar transistor (IGBT), a MOS-FET for electric power, or a bipolar transistor for electric power is used. Further, as the bidirectional DC-DC converter 3, a non-isolated bidirectional DC-DC converter 3 using the element described above, an isolated bidirectional DC-DC converter 3 using a transformer, or the like can be used.

As the first storage battery 1, a large capacity secondary battery is used. In particular, for mobile applications, importance is placed on a high weight energy density and a high volumetric energy density, and thus, a lithium-ion secondary battery is used. On the other hand, for stationary applications, it is conceivable that importance may not be placed on the energy density, and thus, it is enough that the first storage battery 1 is a large capacity storage device.

The first storage battery 1 outputs most energy in the system. Therefore, the first storage battery 1 is charged to a high state of charge (SOC) close to 100%. In a high SOC close to 100%, the lithium-ion secondary battery serving as the first storage battery 1 reaches the upper limit voltage due to voltage fluctuations in high rate charging such as regeneration, and thus, it is preferred to perform high rate charging with the SOC being 95% or more in the second storage battery 2.

As the second storage battery 2, a high power storage device, e.g., a lithium-ion secondary battery, a nickel metal hydride battery, or an electric double-layer capacitor is used. In other words, the second storage battery 2 is a smaller capacity and higher power density storage battery compared with the first storage battery 1. In this case, a main purpose of the second storage battery 2 as an element that forms the multiple-power supply system is to store regeneration electric power generated by the motor generator 42 and to supply instantaneous electric power as the electric power giving/receiving equipment.

With regard to the first storage battery 1, importance is placed on a high energy density, and thus, the first storage battery 1 is not suitable for accommodating high input/output instantaneous electric power. In order to accommodate high input/output electric power, it is necessary to increase the number of the storage batteries that are mounted to increase the electric power capacity. However, in this case, unnecessary electric energy capacity is mounted, which leads to upsizing and higher costs. A main purpose of the second storage battery 2 is to reduce the burden of high input/output electric power on the first storage battery 1 and to take charge of electric power regeneration and high output electric power. Further, high rate charging/discharging is performed to the second storage battery 2, and thus, it is preferred not to use the second storage battery 2 with the SOC being 100% but to use the second storage battery 2 with the SOC being from around 50% to around 70%. Specifically, it is preferred that the second storage battery 2 be used in an SOC range of from about 20% to about 90%.

In a lead-acid battery or a nickel metal hydride battery, in the case of a high SOC close to 100%, polarization in charging is to a large extent, and the charging efficiency is extremely reduced. In a lead-acid battery or a nickel metal hydride battery, in high rate charging with a high SOC, the energy is used for decomposing water serving as a solvent of an electrolyte solution, and heat is generated by decomposition energy. Therefore, the temperature of the battery increases and the lifetime of the battery may be shortened. Accordingly, it is preferred that high-rate charging in a state close to the fully charged state be avoided. Specifically, it is preferred to avoid use with the SOC being 90% or more also from the viewpoint of energy efficiency.

When the first storage battery 1 is a lithium-ion secondary battery, the nominal voltage Va is, for example, 2.0 V to 4.2 V×(the number of the cells). However, the nominal voltage Va varies depending on the active material used. Similarly, for example, when lithium cobalt oxide, lithium nickel oxide, or lithium manganese oxide, or a mixture thereof is used as an active material for a positive electrode and a carbon material is used for a negative electrode, the nominal voltage Va is 3.6 V to 3.8 V per cell. When lithium titanium oxide is used for the negative electrode, the nominal voltage Va is 2.2 V to 2.5 V per cell. When lithium iron phosphate is used for the positive electrode and a carbon material is used for the negative electrode, the nominal voltage Va is 3.2 V to 3.3 V per cell.

Further, when the second storage battery 2 is a secondary battery, similarly, the nominal voltage is represented by Vb. When the second storage battery 2 is an electric double-layer capacitor or a capacitor, Vb may be represented not as the nominal voltage but as a normal upper limit voltage. For example, in the case of a nickel metal hydride battery, Vb is often represented as 1.2 V×(the number of the cells). In the case of a lead-acid battery, Vb is often represented as 2.0 V×(the number of the cells). However, as in a lead-acid battery for use in an automobile, there are a battery in which 6 cells are connected in series with the unit being 12 V or a lead-acid battery in which 12 cells are connected in series with the unit being 24 V, and thus, the present invention is not limited to the one above. When the second storage battery 2 is a lithium-ion secondary battery, similarly to the first storage battery 1, Vb is 2.0 V to 4.2 V×(the number of the cells).

Next, the relationship between the first storage battery 1 and the second storage battery 2 is described.

First, in this embodiment, the voltage of the first storage battery 1 is represented by V1 and the voltage of the second storage battery 2 is represented by V2. The voltage V1 of the first storage battery 1 and the voltage V2 of the second storage battery 2 are variable, but are set so that V1<V2 may be satisfied.

In this case, in forming a battery system, variable battery voltages such as V1 and V2 are not indicated and nominal voltages are indicated. The nominal voltage Va of the first storage battery 1 is used as a representative value of V1 and the nominal voltage Vb of the second storage battery 2 is used as a representative value of V2.

In this embodiment, the configuration is formed so that Va<Vb may be satisfied.

Further, the storage capacity of the first storage battery 1 is represented by U1 and the storage capacity of the second storage battery 2 is represented by U2, and the configuration is formed so that $$U1 > U2$$

may be satisfied.

The storage capacity U1 of the first storage battery 1 is expressed as a discharge capacity from the nominal capacity, the rated capacity, or the fully charged state of the battery, and is expressed as, in the case of a lithium-ion secondary battery, for example, a one-hour rate capacity.

Here, the one-hour rate capacity is a discharge capacity in the case of discharge at a current value when the nominal capacity or the rated capacity of the battery is discharged in one-hour. For example, the one-hour rate capacity is a discharge capacity in the case of discharge at of a battery having a rated capacity of 5 Ah.

Further, similarly, the storage capacity U2 of the second storage battery 2 is expressed as a discharge capacity from the nominal capacity, the rated capacity, or the fully charged state of the battery. Further, the state in which U2 is fully charged is usually expressed as the SOC of 100%. In the case of a lithium-ion secondary battery or a nickel metal hydride battery, U2 is often expressed as a one-hour rate capacity, and, in the case of a lead-acid battery, U2 is often expressed as a five-hour rate capacity. Here, the five-hour rate capacity is a capacity by which a battery having a rated capacity U1 Ah (ampere hour) can be discharged at a current value of U1/5 for five hours. For example, the five-hour rate capacity is a discharge capacity when a battery having a rated capacity of 5 Ah is discharged at 1 A.

However, indication of the storage capacity of a storage battery varies depending on the manufacturers, and thus, this should not be regarded as a limitation.

Further, when the electric energy of the first storage battery 1 is represented by Wh1 and the electric energy of the second storage battery 2 is represented by Wh2, setting is made so that $$Wh1 > Wh2$$

may be satisfied.

The electric energy Wh1 of the first storage battery 1 indicates the nominal electric energy or the rated electric energy of the battery, and is expressed by $$Wh1 = Va \times U1.$$

Further, similarly, the electric energy Wh2 of the second storage battery 2 indicates the nominal electric energy or the rated electric energy, and is expressed by $$Wh2 = Vb \times U2.$$

In a case in which the second storage battery 2 is an electric double-layer capacitor, when the capacitance of the electric double-layer capacitor used is represented by C F (farad), in this case, $$Wh2 = (C \times Vb^2)/2 \div 3600 \text{(unit: } Wh\text{)}.$$

In this case, when the first storage battery 1 is fully charged to the storage capacity U1, the voltage is the maximum voltage in normal use. The voltage at this time is represented by V1max. In other words, V1max is the voltage of the first storage battery 1 when the SOC is 100%.

If the first storage battery 1 and the second storage battery 2 on the higher voltage side are electrically connected due to system malfunction, a current flows from the second storage battery 2 on the higher voltage side to the first storage battery 1 on the lower voltage side so that the voltages may be the same. At this time, the current capacity that flows from the second storage battery 2 into the first storage battery 1 is represented by ΔU, and the voltage increase of the first storage battery 1 at this time is represented by ΔV1.

Next, a case is described in which in the multiple-power supply system according to the present invention, the first storage battery 1 on the lower voltage side and the second storage battery 2 on the higher voltage side are electrically connected due to system malfunction.

An energy transfer amount when energy transfers from the second storage battery 2 on the higher voltage side to the first storage battery 1 on the lower voltage side is represented by ΔWh.

Here, the safe maximum voltage of the large capacity first storage battery 1 is represented by V1Hlim. It is necessary to set V1Hlim so that the safety may be secured even when the capacity ΔU1 is received by the first storage battery 1 and the voltage V1 increases by ΔV1. Specifically, $$V1Hlim \geq V1max + \Delta V1$$

is required to be satisfied.

Further, when the capacity to which the first storage battery 1 can be safely charged (safe maximum capacity) is represented by U1lim, $$U1lim \geq U1 + \Delta U1$$

is required to be satisfied.

In other words, through forming the first and second storage batteries so that Va<Vb and U1>U2 may be satisfied and through designing the batteries so that the safe maximum voltage V1Hlim may not be exceeded, the multiple-power supply system can be safely charged and discharged even under abnormal DC-DC converter conditions or even when malfunction occurs in switching the switches.

The invention described above is summarized as follows.

The power supply system according to this embodiment includes the first (1) and second (2) storage batteries connected in parallel to the electric power giving/receiving equipment (40), the bidirectional DC-DC converter (3) configured to give/receive electric power between the first (1) and second (2) storage batteries, the switches capable of independently isolating the first and second storage batteries from the load apparatus, and the controller (4) configured to control the switches and the DC-DC converter. Further, when the nominal voltage of the first storage battery is represented by Va, the rated capacity of the first storage battery is represented by U1, the nominal voltage of the second storage battery is represented by Vb, and the rated capacity of the second storage battery is represented by U2, the first and second storage batteries are formed so that the relational expressions Va<Vb and U1>U2 may be satisfied. The nominal voltage Va of the first storage battery, the rated capacity U1 of the first storage battery, the nominal voltage Vb of the second storage battery, and the rated capacity U2 of the second storage battery are set so that the voltage of the first storage battery may not exceed the predetermined upper limit value V1Hlim or so that the capacity of the first storage battery may not exceed the predetermined upper limit value U1lim, the voltage and the capacity of the first storage battery increasing when electrical energy transfers from the second storage battery to the first storage battery. In other words, the nominal voltages (Va and Vb) and the rated capacities (U1 and U2) of the first and second storage batteries are elaborated at the time of manufacture as design specifications of the respective storage batteries. Further, the upper limit values (V1Hlim and U1lim) are reference values of the storage battery that are determined based on the design specifications of the storage battery.

The switches capable of independently isolating the first and second storage batteries from the load apparatus according to this embodiment include the first switch (12) arranged between the first storage battery (1) and the electric power giving/receiving equipment (40) and the second switch (13) arranged between the second storage battery (2) and the electric power giving/receiving equipment (40).

Further, the power supply system according to this embodiment includes the third switch (11) configured to switch a first electric power path (51) connecting the first storage battery (1) to the electric power giving/receiving equipment (40) and a second electric power path (52) connecting the second storage battery to the electric power giving/receiving equipment.

Further, when the electric power amount that is the product of the nominal voltage and the rated capacity of the first storage battery is represented by Wh1 and the electric power amount that is the product of the nominal voltage and the rated capacity of the second storage battery is represented by Wh2, through designing the first and second storage batteries so that the relational expression Wh1>Wh2 may be satisfied, even when malfunction of the switches occurs leading to a state in which the storage batteries are short-circuited, the storage batteries can be held in a state of being less liable to be overcharged or overdischarged.

Specific examples of the present invention are described below.

When the first storage battery 1 is a lithium ion secondary battery, the safe maximum voltage V1Hlim of the first storage battery 1 varies depending on the active material used. For example, in the case of a lithium ion secondary battery in which lithium cobalt oxide, lithium nickel oxide, or lithium manganese oxide, or a mixture thereof is used as the active material for the positive electrode and a carbon material is used for the negative electrode, it is preferred that V1Hlim be 4.3 V or less per cell. This is because, when V1Hlim is 4.3 V or less per cell, a side reaction, e.g., decomposition of the electrolyte solution does not occur in a short term and the battery can be reversibly used. If V1Hlim is more than 4.3 V per cell, due to a side reaction, e.g., decomposition of the electrolyte solution, the internal pressure of the battery may increase, and, if V1Hlim is 4.5 V or more, the battery may generate heat. Further, when lithium titanium oxide is used for the negative electrode, V1Hlim is 3.5 V or less per cell. If V1Hlim is more than 3.5 V per cell, due to a side reaction, e.g., decomposition of the electrolyte solution, the internal pressure of the battery may increase, and, if V1Hlim is 4.5 V or more per cell, the battery may generate heat. When lithium iron phosphate is used for the positive electrode and a carbon material is used for the negative electrode, it is necessary that V1Hlim be 4.0 V or less per cell. If V1Hlim is more than 4.0 V per cell, due to a side reaction, e.g., decomposition of the electrolyte solution, the internal pressure of the battery may increase, and, if V1Hlim is 4.5 V or more per cell, the battery may generate heat.

Similarly, when the first storage battery 1 is a lithium ion secondary battery, the safe maximum capacity U1lim of the first storage battery 1 varies depending on the battery, but generally, it is preferred that U1lim be 1.2 times or less as large as U1. This is because, when U1lim is 1.2 times or less as large as U1, a side reaction, e.g., decomposition of the electrolyte solution does not occur in a short term and the battery can be reversibly used. The lithium ion secondary battery is often a closed system for the purpose of preventing entrance of outside air. If U1lim is more than 1.2 times as large as U1, due to a side reaction, e.g., decomposition of the electrolyte solution, the internal pressure of the battery may increase. Further, if U1lim is two times or more as large as U1, the battery may generate heat.

In particular, when lithium iron phosphate is used for the positive electrode, if U1lim is more than 1.2 times as large as U1, a safety valve of the battery often opens. In this case, when the electric power amount that can be safely charged to the first storage battery 1 (safe maximum electric power amount) is represented by Wh1lim, $$Wh1lim \approx Va \times U1lim \approx 1.2 \times Wh1.$$

It is preferred that Wh1lim be set to be 1.2 times or less as large as the electric power amount Wh1 of the first storage battery 1.

The electric power amount ΔWh that transfers when the first storage battery 1 and the second storage battery 2 on the higher voltage side are electrically connected due to system malfunction is equal to or less than the electric power amount Wh2 of the second storage battery 2, and thus, $$Wh2 \geq \Delta Wh.$$

In other words, it is necessary to design the first storage battery 1 so that, even when the first storage battery 1 receives the electric power amount Wh2 of the second storage battery 2, the electric power amount Wh1lim that can be safely charged may not be reached.

In other words, the setting is required to be set so that the following relationship may be satisfied.

$$Wh1lim \approx 1.2 \times Wh1 \geq Wh1 + Wh2$$

The above expression is simplified to obtain the following expression.

$$Wh2 \leq 0.2 \times Wh1$$

In other words, through setting Wh2 to be 0.2 time or less as large as Wh1, the electric power amount can be in a range of safe charging.

The invention described above is summarized as follows.

In the power supply system according to this embodiment, further, when the electric power amount that is the product of the nominal voltage and the rated capacity of the first storage battery is represented by Wh1 and the electric power amount that is the product of the nominal voltage and the rated capacity of the second storage battery is represented by Wh2, through designing the first and second storage batteries so that Wh2 is 0.2 time or less as large as Wh1, even when malfunction of the power supply system occurs leading to a state in which the storage batteries are short-circuited, the storage batteries can be held in a state of being less liable to be overcharged or overdischarged. This is particularly effective when lithium iron phosphate is used for the positive electrode.

Further, when the voltage value to which the voltage approaches when the first storage battery 1 having the upper limit voltage V1max and the second storage battery 2 having the upper limit voltage V2max are electrically connected in parallel due to system malfunction is represented by V12max, the following is satisfied.

$$V12max \approx V1max + (V2max - V1max) \times Wh2 \div (Wh1 + Wh2)$$

As a guideline for safety, the setting is made so that this value may satisfy V1Hlim>V12max.

In this embodiment, the voltage V1 of the first storage battery 1 and the voltage V2 of the second storage battery 2 has the relationship of $$V1 < V2,$$

and thus, when the first storage battery 1 and the second storage battery 2 are connected when system malfunction occurs, V1 increases and V2 reduces. Therefore, it is necessary that V1 define the safe maximum voltage V1Hlim and that V2 define the safe minimum voltage V2Llim.

Here, when the second storage battery 2 is a lithium ion secondary battery, the safe minimum voltage V2Llim of the second storage battery 2 varies depending on the active material used. For example, in the case of a lithium ion secondary battery in which lithium cobalt oxide, lithium nickel oxide, or lithium manganese oxide, or a mixture thereof is used as the active material for the positive electrode and a carbon material is used for the negative electrode, the voltage when the capacity U1 is discharged from the fully charged state is from 2.5 V to 3.0 V per cell. In this case, the safe minimum voltage V2Llim of the second storage battery 2 is set to be from 0.5 V to 1.5 V per cell. It is further preferred that the safe minimum voltage V2Llim be set to be 1.0 V. This is because, if the voltage is smaller than the safe minimum voltage V2Llim, the internal pressure may increase or an internal short circuit due to deposition of a current collecting metal may be made. When lithium titanium oxide is used for the negative electrode, the voltage when the capacity U1 is discharged from the fully charged state is about 1.5 V, and thus, it is necessary to set V2Llim to be about 1.0 V per cell. Further, when lithium iron phosphate is used for the positive electrode and a carbon material is used for the negative electrode, the voltage when the capacity U1 is discharged from the fully charged state is about 2 V, and thus, the safe minimum voltage V2Llim of the second storage battery 2 is set to be from 0.5 V to 1.5 V per cell. It is further preferred that the safe minimum voltage V2Llim be set to be 1.0 V. In this case, similarly, if the voltage is smaller than the safe minimum voltage V2Llim, the internal pressure may increase or an internal short circuit due to deposition of a current collecting metal may be made. In other words, when the second storage battery is a lithium ion secondary battery, the setting may be made so that $$V2Llim=1.0V \times \text{(the number of the cells in series)}$$

may be satisfied.

Further, in the first storage battery 1, when the storage capacity U1 is discharged from the fully charged state, the voltage is the lower limit voltage in normal use. The voltage at this time is represented by V1min. In other words, V1min is the voltage of the first storage battery 1 when the SOC is 0%. Similarly, in the second storage battery 2, when the storage capacity U2 is discharged from the fully charged state, the voltage is the lower limit voltage in normal use. The voltage at this time is represented by V2min. In other words, V2min is the voltage of the second storage battery 2 when the SOC is 0%. When the voltage value to which the voltage approaches when the first storage battery 1 having the lower limit voltage V1min and the second storage battery 2 having the lower limit voltage V2min are electrically connected in parallel due to system malfunction is represented by V12min, as a guideline for safety, the setting is made so that this value may satisfy $$V2Llim<V12min.$$

Figure 2:
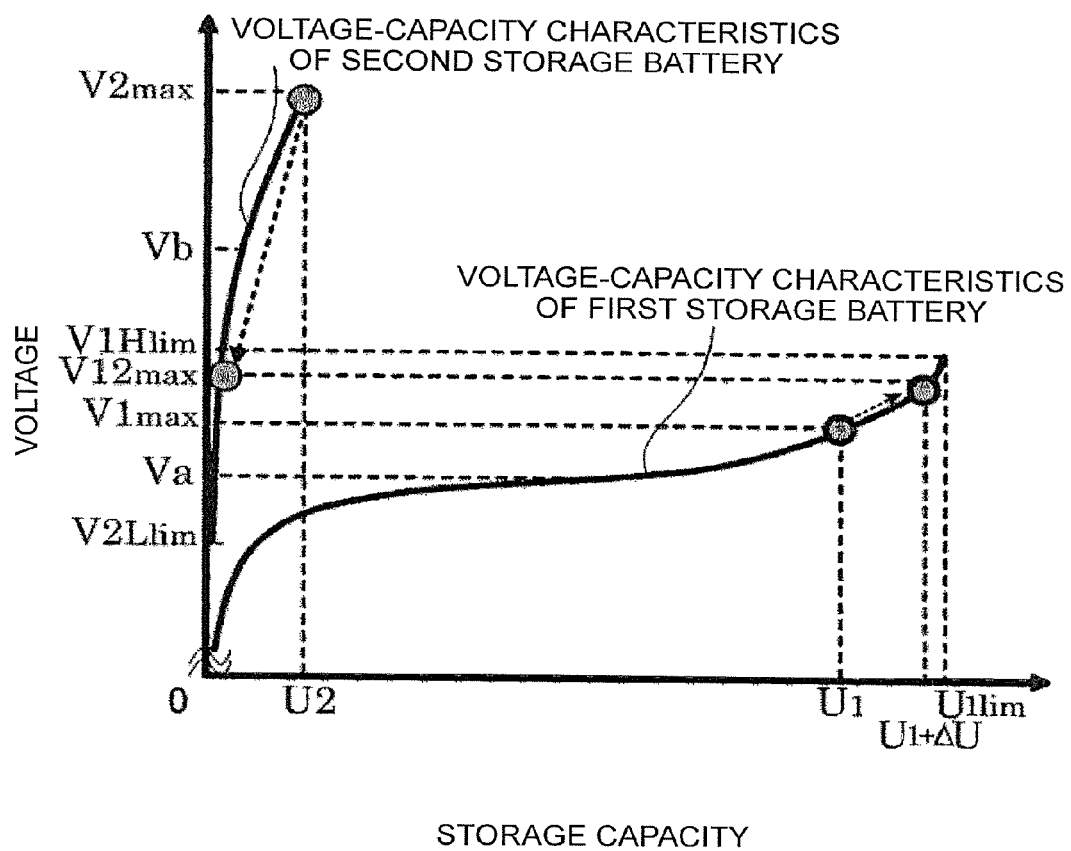
FIG. 2 is a schematic graph for showing voltage-capacity characteristics of storage batteries according to Embodiment 1 of the present invention.
Figure 3:
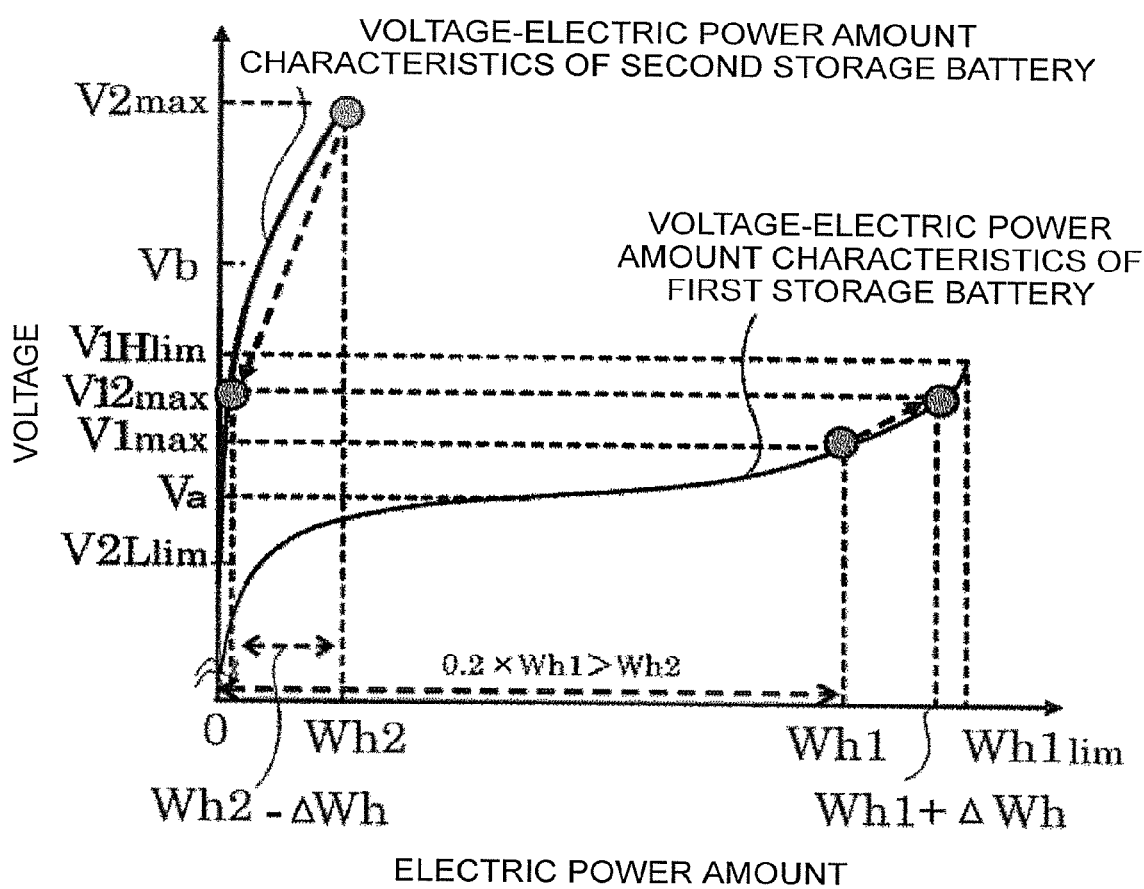
FIG. 3 is a schematic graph for showing voltage-electric power amount characteristics of the storage batteries according to Embodiment 1 of the present invention.

In FIG. 2, voltage-capacity characteristics of the first storage battery 1 and voltage-capacity characteristics of the second storage battery 2 are shown. Further, in FIG. 3, voltage-electric power amount characteristics of the first storage battery 1 and voltage-electric power amount characteristics of the second storage battery 2 are shown.

The controller 4 according to this embodiment turns on and off the switches 11, 12, and 13, measures a current, measures a voltage, controls the DC-DC converter 3, and controls the inverter 41.

In the voltage measurement, the voltage V1 of the first storage battery 1, the voltage V2 of the second storage battery 2, and a voltage Vc of the smoothing capacitor (snubber capacitor) 31 are measured. As the smoothing capacitor, a capacitor having satisfactory frequency characteristics is used, and a film capacitor, an oil capacitor, an aluminum electrolytic capacitor, or the like is used.

In the current measurement, a current I1a that flows into/out of the first storage battery 1, a current I1b between the first storage battery 1 and the DC-DC converter 3, a current I2a that flows into/out of the second storage battery 2, and a current I2b between the second storage battery 2 and the DC-DC converter 3 are measured.

The switches (relays) connect and open electric power lines. The third switch 11 is a switch configured to switch the electric power line of the first storage battery 1 (first electric power path 51) and the electric power line of the second storage battery 2 (second electric power path 52) to each other. The first switch 12 opens/closes a negative electrode-side electric power line 53 of the first storage battery 1, and the second switch 13 opens/closes the negative electrode-side electric power line 53 of the second storage battery 2. The switch 12 and the switch 13 are normally in an open state.

Exemplary operation of the multiple-power supply system according to the present invention is described.

With regard to the connection state of the multiple-power supply system, when power running (electric power is supplied from the storage battery to the motor generator 42) is normally the main operation, electric power is supplied from the first storage battery 1 serving as a large capacity storage battery. At this time, if the electric power is supplied from the first storage battery 1 via the DC-DC converter 3, an efficiency η of the DC-DC converter 3 acts thereon, and thus, the first storage battery 1 is connected without the DC-DC converter 3. In this case, the switch 11 is connected to the electric power line of the first storage battery 1 (first electric power path 51), and the switch 12 and the switch 13 are in a connection state. This state is referred to as a connection state 1.

Meanwhile, when the efficiency of the DC-DC converter 3 is represented by η, when regeneration and power running are frequently performed, connecting the second storage battery 2 serving as a high output storage battery to the inverter 41 without the DC-DC converter 3 prevents the efficiency η of the DC-DC converter 3 from acting thereon, which is convenient. In this case, the switch 11 is connected to the electric power line of the second storage battery 2 (second electric power path 52) and the switch 12 and the switch 13 are in the connection state. This state is referred to as a connection state 2.

In the multiple-power supply system according to the present invention, connection of the plurality of storage devices having different voltages is switched using the switches. At this time, for the purpose of reducing ripples from the inverter 41, the voltage of the smoothing capacitor 31 connected in parallel is connected. The voltage of the smoothing capacitor 31 is the voltage of the connected storage battery, and thus, when a switch to a storage battery having a different voltage is made, it is necessary to uniform the voltages before switching the connection.

Figure 4:
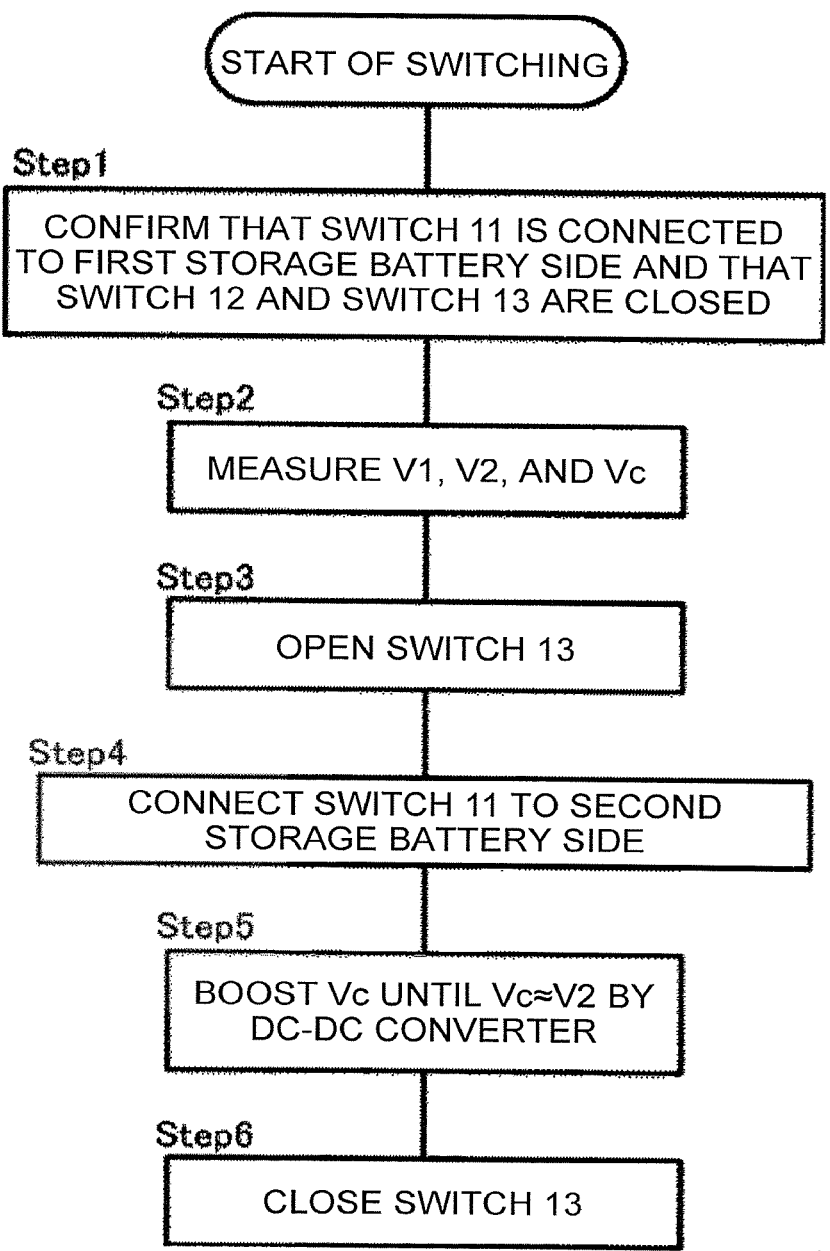
FIG. 4 is a flow chart for illustrating operation of the power supply system according to Embodiment 1 of the present invention.
Figure 5:
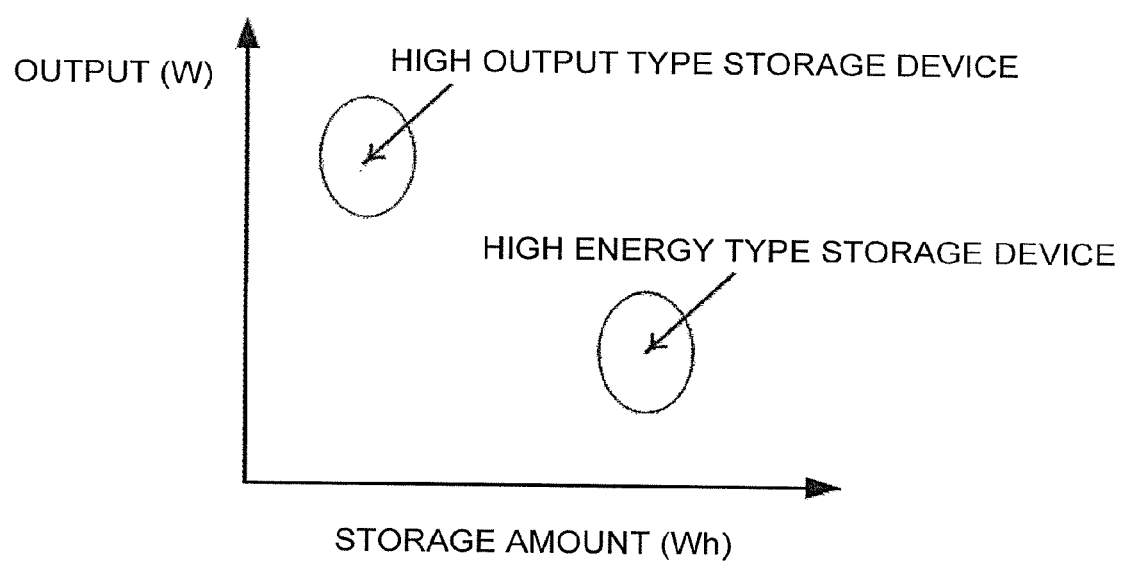
FIG. 5 is a graph for showing relationship between a large capacity and high energy density storage device and a small capacity and high output density storage device.

FIG. 4 is an illustration of an exemplary method of operation of the switches in a shift from the connection state 1 to the connection state 2. In the connection state 1, the switch 11 is connected to the first storage battery 1, and thus, (the voltage Vc of the smoothing capacitor)≈V1. After the switch 13 is opened to isolate the circuit of the second storage battery 2, the switch 11 is connected to the electric power line of the second storage battery 2. After that, the voltage Vc of the smoothing capacitor is boosted to V2 using the first storage battery 1 via the DC-DC converter 3, and the switch 13 is closed.

Similarly, in a shift from the connection state 2 to the connection state 1, the switch 11 is connected to the second storage battery 2, and thus, (the voltage Vc of the smoothing capacitor)≈V2. After the switch 12 is opened to isolate the circuit of the first storage battery 1, the switch 11 is connected to the first storage battery 1 side. After that, the voltage Vc of the smoothing capacitor is lowered to V1 using the second storage battery 2 via the DC-DC converter 3, and the switch 12 is closed. By making connections as described above, the connection between the storage batteries having different voltages can be switched.

Example 1 of this embodiment is described. 80 cells of lithium ion secondary batteries each using an active material of a mixture of cobalt, nickel, and manganese for the positive electrode and using a graphite-based active material for the negative electrode were connected in series to be used as the first storage battery 1. The nominal voltage Va, the rated capacity U1, and the electric power capacity Wh1 of the first storage battery 1 were 296 V, 45 Ah, and 13.32 kWh, respectively. The voltage V1max when the first storage battery 1 was charged to 45 Ah was 328 V. Further, the safe maximum voltage V1Hlim of the first storage battery 1 was 344 V, and the capacity U1lim to which the first storage battery 1 can be safely charged was 54 Ah. Further, 100 cells of lithium ion secondary batteries each using an active material of a mixture of cobalt, nickel, and manganese for the positive electrode and using an active material of hard carbon for the negative electrode were connected in series to be used as the second storage battery 2. The nominal voltage Vb, the rated capacity U2, and the electric power capacity Wh2 of the second storage battery 2 were 370 V, 4 Ah, and 1.48 kWh, respectively. The voltage V2max when the second storage battery 2 was charged to 4 Ah was 410 V. Further, the safe maximum voltage V2Hlim of the second storage battery 2 was 430 V. Further, the safe minimum voltage V2Llim of the second storage battery 2 was 100 V. In this case, Va<Vb, U1>U2, and 0.2×Wh1>Wh2.

A case was supposed in which the first storage battery 1 and the second storage battery 2 both in the fully charged state were electrically connected due to system malfunction. In this case, the voltage of the second storage battery 2 approached the voltage of the large storage capacity first storage battery 1, and the voltages of the first storage battery 1 and the second storage battery 2 became 334 V. The voltage increase ΔV1 was 8 V, the increased storage capacity ΔU1 of the first storage battery 1 was 3.5 Ah, and the electric power transfer amount ΔWh from the first storage battery 1 to the second storage battery 2 was about 1.3 kW. At this time, Va<Vb, U1>U2, and 0.2×Wh1>Wh2, and thus, even when the first storage battery 1 receives the capacity ΔU1 flowed from the second storage battery 2, the following are satisfied.

$$U1lim > U1 + \Delta U1$$

$$V1Hlim > V1max + \Delta V1$$

V1Hlim>V12max

V12max>V2Llim

Therefore, the voltage and the capacity are within the safe maximum voltage and the safe maximum capacity, respectively, of the battery. Further, the guideline for safety of the voltage is also followed.

U1lim is a capacity value charging above which may lead to heat generation, U1 is the rated capacity, and ΔU1 is the capacity that flows from the second storage battery into the first storage battery. V1Hlim is the safe maximum voltage of the first storage battery, and, in the case of Example 1, 4.3 V per cell. V1max is the voltage value when the battery is charged to its rated current, and the upper limit voltage for use. ΔV1 is the voltage increase value of the first storage battery 1 when the capacity ΔU flows thereinto. Exemplary values can be as follows.

U1lim=54 Ah, U1=45 Ah, ΔU1=3.5 Ah, V1Hlim=344 V, V1max=328 V, and ΔV1=8 V

In other words, a multiple-power supply system having the configuration described above can be charged and discharged efficiently and safely even under abnormal DC-DC converter conditions or even when malfunction occurs in switching the switches.

As Comparative Example 1, here, a case in which Va>Vb and U1>U2 is considered. 100 cells of lithium ion secondary batteries each using an active material of a mixture of cobalt, nickel, and manganese for the positive electrode and using a graphite-based active material for the negative electrode were connected in series to be used as the first storage battery 1. The nominal voltage Va, the rated capacity U1, and the electric power capacity Wh1 of the first storage battery 1 were 370 V, 45 Ah, and 16.65 kWh, respectively. The voltage V1max when the first storage battery 1 was charged to 45 Ah was 410 V. Further, the safe maximum voltage V1Hlim of the first storage battery 1 was 420 V, and the capacity U1lim to which the first storage battery 1 can be safely charged was 54 Ah. Further, 80 cells of lithium ion secondary batteries each using an active material of a mixture of cobalt, nickel, and manganese for the positive electrode and using an active material of hard carbon for the negative electrode were connected in series to be used as the second storage battery 2. The nominal voltage Vb, the rated capacity U2, and the electric power capacity Wh2 of the second storage battery 2 were 296 V, 4 Ah, and 1.18 kWh, respectively. The voltage V2max when the second storage battery 2 was charged to 4 Ah was 328 V. Further, the safe maximum voltage V2Hlim of the second storage battery 2 was 344 V.

Similarly, a case was supposed in which the first storage battery 1 and the second storage battery 2 both in the fully charged state were electrically connected due to system malfunction. The voltage of the second storage battery 2 approached the voltage of the large capacity first storage battery 1, and exceeded 344 V serving as the safe maximum voltage V2Hlim of the second storage battery 2, and thus, the experiment was stopped.

Further, as Comparative Example 2, here, a case in which Va<Vb and U1<U2 is considered. 80 cells of lithium ion secondary batteries each using an active material of a mixture of cobalt, nickel, and manganese for the positive electrode and using an active material of hard carbon for the negative electrode were connected in series to be used as the first storage battery 1.

The nominal voltage Va, the rated capacity U1, and the electric power capacity Wh1 of the first storage battery 1 were 296 V, 4 Ah, and 1.18 kWh, respectively. The voltage V1max when the first storage battery 1 was charged to 4 Ah was 328 V. Further, the safe maximum voltage V1Hlim of the first storage battery 1 was 344 V, and the capacity U1lim to which the first storage battery 1 can be safely charged was 4.4 Ah. Further, 100 cells of lithium ion secondary batteries each using an active material of a mixture of cobalt, nickel, and manganese for the positive electrode and using a graphite-based active material for the negative electrode were connected in series to be used as the second storage battery 2. The nominal voltage Vb, the rated capacity U2, and the electric power capacity Wh2 of the second storage battery 2 were 370 V, 45 Ah, and 16.65 kWh, respectively. The voltage V2max when the second storage battery 2 was charged to 50 Ah was 410 V. Further, the safe maximum voltage V2Hlim of the second storage battery 2 was 430 V.

Similarly, a case was supposed in which the first storage battery 1 and the second storage battery 2 both in the fully charged state were electrically connected due to system malfunction. The voltage of the first storage battery 1 approached the voltage of the large capacity second storage battery 2, and exceeded 344 V serving as the safe maximum voltage V1Hlim of the first storage battery 1, and thus, the experiment was stopped.

Next, Example 2 of this embodiment is described. 16 cells of lithium ion secondary batteries each having a nominal voltage of 3.2 V and a rated capacity of 45 Ah were connected in series and two such series connections were connected in parallel to be used as the first storage battery 1. The nominal voltage Va, the rated capacity U1, and the electric power capacity Wh1 of the first storage battery 1 were 51.2 V, 90 Ah at 1 C, and 4.6 kWh, respectively. The voltage V1max when the first storage battery 1 was charged to 90 Ah was 54.4 V. Further, the safe maximum voltage V1Hlim of the first storage battery 1 was 64 V, and the capacity U1lim to which the first storage battery 1 can be safely charged was 108 Ah. 100 cells of nickel metal hydride batteries were connected in series to be used as the second storage battery 2. The nominal voltage Vb, the rated capacity U2, and the electric power capacity Wh2 of the second storage battery 2 were 120 V, 6 Ah, and 0.72 kWh, respectively. The voltage V2max when the second storage battery 2 was charged to 6 Ah was 140 V. Further, the safe maximum voltage V2Hlim of the second storage battery 2 was 150 V. In this case, Va<Vb, U1>U2, and 0.2×Wh1>Wh2.

A case was supposed in which the first storage battery 1 and the second storage battery 2 both in the fully charged state were electrically connected due to system malfunction. In this case, the voltage of the second storage battery 2 approached the voltage of the large storage capacity first storage battery 1, and the voltages of the first storage battery 1 and the second storage battery 2 became 60.8 V. The voltage increase ΔV1 was 6.4 V, the increased storage capacity ΔU1 of the first storage battery 1 was approximately 12 Ah, and the electric power transfer amount ΔWh from the first storage battery 1 to the second storage battery 2 was about 0.7 kW. At this time, Va<Vb, U1>U2, and 0.2×Wh1>Wh2, and thus, even when the first storage battery 1 receives the capacity ΔU1 flowed from the second storage battery 2, the following are satisfied.

$$U1lim > U1 + \Delta U1$$

$$V1Hlim > V1max + \Delta V1$$

$$V1Hlim > V12max$$

Therefore, the voltage and the capacity are within the safe maximum voltage and the safe maximum capacity, respectively, of the battery. Further, the guideline for safety of the voltage is also followed.

U1lim is a capacity value charging above which may lead to heat generation, U1 is the rated capacity, and ΔU1 is the capacity that flows from the second storage battery into the first storage battery. V1Hlim is the safe maximum voltage of the first storage battery, and, in the case of Example 2, 4 V per cell. V1max is the voltage value when the battery is charged to its rated current, and the upper limit voltage for use. ΔV1 is the voltage increase value of the first storage battery 1 when the capacity ΔU flows thereinto. Exemplary values can be as follows.

U1lim=108 Ah, U1=90 Ah, ΔU1=12 Ah,
V1Hlim=64 V, V1max=54.4 V, and ΔV1=6.4V

In other words, a multiple-power supply system having the configuration described above can be charged and discharged efficiently and safely even under abnormal DC-DC converter conditions or even when malfunction occurs in switching the switches.

As Comparative Example 3, here, a case in which Va<Vb U1>U2, and 0.2×Wh1<Wh2 is described. 16 cells of lithium ion secondary batteries each having a rated voltage of 3.2 V and a capacity of 45 Ah were connected in series and two such series connections were connected in parallel to be used as the first storage battery 1. The nominal voltage Va, the rated capacity U1, and the electric power capacity Wh1 of the first storage battery 1 were 51.2 V, 90 Ah at 1 C, and 4.6 kWh, respectively, and the voltage V1max when the first storage battery 1 was charged to 90 Ah was 54.4 V. Further, the safe maximum voltage V1Hlim of the first storage battery 1 was 64 V, and the capacity U1lim to which the first storage battery 1 can be safely charged was 108 Ah. 150 cells of nickel metal hydride batteries were connected in series to be used as the second storage battery 2. The nominal voltage Vb, the rated capacity U2, and the electric power capacity Wh2 of the second storage battery 2 were 180 V, 6 Ah, and 1.1 kWh, respectively. The voltage V2max when the second storage battery 2 was charged to 6 Ah was 210 V. Further, the safe maximum voltage V2Hlim of the second storage battery 2 was 225 V. In this case, Va<Vb, U1>U2, and 0.2×Wh1>Wh2.

Similarly, an experiment was carried out for a case in which the first storage battery 1 and the second storage battery 2 both in the fully charged state were electrically connected due to system malfunction. The voltage of the second storage battery 2 approached the voltage of the large capacity first storage battery 1, the voltage of the first storage battery 1 also increases to exceed 64 V serving as the safe maximum voltage V1Hlim of the first storage battery 1, and thus, the experiment was stopped.

As described above, in the power supply system including the first storage battery 1, which is lithium ion secondary batteries, the second storage battery 2, the DC-DC converter 3, the switches, the controller, and the smoothing capacitor, through setting the voltages, capacities, and electric power amounts of the first storage device and the second storage device so as to satisfy the relationships of Va<Vb, U1>U2, and 0.2×Wh1>Wh2, the system can be safe even when the first storage battery 1 and the second storage battery 2 are directly connected under abnormal conditions.

In the configuration of the related art, a plurality of electric power supply paths may be obtained using a switch or the like. In this case, the storage batteries may be unexpectedly connected due to, for example, system malfunction. When the storage batteries are connected, energy stored in one storage battery transfers to another storage battery having a lower voltage, which may lead to explosion or burning, and thus, the design is required to take such matters into consideration.

Accordingly, in the power supply system according to the present invention, the relationship among the voltages, current capacities, and electric power capacities of the storage batteries is defined so that, even when energy transfers from the storage battery on the higher voltage side to the storage battery on the lower voltage side under abnormal conditions, the storage batteries can be held in a state of being less liable to be overcharged or overdischarged.

In other words, even when malfunction occurs in switching the switches, the limit voltages and the electric power amounts of the first and second storage batteries are defined to minimize damage to the second storage battery.

Note that, the embodiments described above should be regarded not as limiting but as exemplary in all respects. The scope of the present invention is not the scope of the embodiments described above, but is defined by the attached claims, and includes all equivalents and variations that fall within the scope of the claims.

INDUSTRIAL APPLICABILITY

According to the present invention, the power supply system capable of holding a state in which the storage batteries are less liable to be overcharged or overdischarged can be obtained.

REFERENCE SIGNS LIST

1 first storage battery, 2 second storage battery, 3 bidirectional DC-DC converter, 4 controller, 11 third switch, 12 first switch, 13 second switch, 21 current sensor, 22 current sensor, 23 current sensor, 24 current sensor, 31 smoothing capacitor, 40 power giving/receiving equipment, 41 inverter, 42 motor generator, 51 first electric power path, 52 second electric power path, 53 negative electrode-side electric power line

The invention claimed is:

1. A power supply system, comprising:
   a first storage battery and a second storage battery connected in parallel to electric power giving/receiving equipment;
   a bidirectional DC-DC converter configured to give/receive electric power between the first storage battery and the second storage battery;
   a switch configured to be able to independently isolate the first storage battery and the second storage battery from a load apparatus; and
   a controller configured to control the switch and the DC-DC converter,
   wherein when a nominal voltage of the first storage battery is represented by Va, a rated capacity of the first storage battery is represented by U1, a nominal voltage of the second storage battery is represented by Vb, and a rated capacity of the second storage battery is represented by U2:
   the first storage battery and the second storage battery are formed so that relational expressions Va<Vb and U1>U2 are satisfied; and
   the nominal voltage Va of the first storage battery, the rated capacity U1 of the first storage battery, the nominal voltage Vb of the second storage battery, and the rated capacity U2 of the second storage battery are set so that, when electrical energy transfers from the second storage battery to the first storage battery, voltage increase of the first storage battery does not exceed a predetermined upper limit value V1Hlim, or, a capacity of the first storage battery does not exceed a predetermined upper limit value U1lim.

2. A power supply system according to claim 1,
   wherein the switch configured to be able to independently isolate the first storage battery and the second storage battery from the load apparatus comprises:
      a first switch arranged between the first storage battery and the electric power giving/receiving equipment; and
      a second switch arranged between the second storage battery and the electric power giving/receiving equipment, and
   wherein the power supply system further comprises a third switch configured to switch a first electric power path connecting the first storage battery to the electric power giving/receiving equipment and a second electric power path connecting the second storage battery to the electric power giving/receiving equipment to each other.

3. A power supply system according to claim 1, wherein a relational expression Wh1>Wh2 is satisfied, where Wh1 is an electric power amount that is a product of the nominal voltage and the rated capacity of the first storage battery and Wh2 is an electric power amount that is a product of the nominal voltage and the rated capacity of the second storage battery.

4. A power supply system according to claim 1, wherein Wh2 is set to be 0.2 time or less as large as Wh1, where Wh1 is an electric power amount that is a product of the nominal voltage and the rated capacity of the first storage battery and Wh2 is an electric power amount that is a product of the nominal voltage and the rated capacity of the second storage battery.

5. A power supply system according to claim 1, wherein the electric power giving/receiving equipment comprises equipment comprising a motor generator and an inverter.

* * * * *